United States Patent [19]

Takumi et al.

[11] 4,399,119
[45] Aug. 16, 1983

[54] MANUFACTURE OF SPHERICAL ALUMINA FROM GIBBSITE

[75] Inventors: Shizuo Takumi, Kamakura; Toshio Hashimoto; Masaru Tatsushima, both of Isehara, all of Japan

[73] Assignee: Nikki-Universal Co., Ltd., Tokyo, Japan

[21] Appl. No.: 252,654

[22] Filed: Apr. 9, 1981

[30] Foreign Application Priority Data

Sep. 29, 1980 [JP] Japan ............................ 55/135500

[51] Int. Cl.$^3$ .................................................. C01F 7/02
[52] U.S. Cl. ................................... 423/626; 423/628; 423/631; 252/448
[58] Field of Search ................ 423/626, 628, 631; 252/448

[56] References Cited

U.S. PATENT DOCUMENTS

| | | | |
|---|---|---|---|
| 3,202,480 | 8/1965 | Nixon | 252/448 |
| 4,032,472 | 6/1977 | McCallister | 423/626 |
| 4,216,122 | 8/1980 | Michalko | 423/628 |
| 4,250,058 | 2/1981 | Michalko | 423/628 |
| 4,301,033 | 11/1981 | Takumi et al. | 423/626 |

FOREIGN PATENT DOCUMENTS

| | | | |
|---|---|---|---|
| 1413048 | 11/1975 | United Kingdom | 423/625 |
| 2035280 | 6/1980 | United Kingdom | 423/628 |

*Primary Examiner*—Herbert T. Carter
*Attorney, Agent, or Firm*—Flynn, Thiel, Boutell & Tanis

[57] ABSTRACT

A method of manufacturing spherical alumina particles which comprises the steps of digesting, at an elevated temperature and an elevated pressure, gibbsite with an aqueous hydrochloric acid solution and then forming an aqueous basic aluminum chloride solution; adding, at an elevated temperature, an aqueous ammonia to said aqueous basic aluminum chloride solution to form an alumina hydrosol containing ammonium chloride; commingling said alumina hydrosol with a gelling agent; thereafter dispersing droplets of said mixture in a suspending medium under conditions effective to transform said droplets into hydrogel particles; ageing said hydrogel particles first in said suspending medium and then in aqueous ammonia; and then washing said hydrogel particles with water, drying and calcining to obtain spherical alumina particles.

10 Claims, No Drawings

MANUFACTURE OF SPHERICAL ALUMINA FROM GIBBSITE

BACKGROUND OF THE INVENTION

The present invention relates to a method of manufacturing spherical alumina particles according to the oil-drop method. In particular, it relates to a method which comprises preparing alumina hydrosol, a precursor of said spherical alumina particles, by using gibbsite as the starting material, and obtaining spherical alumina particles from said alumina hydrosol by means of the known oil-drop method.

Alumina hydrosol transformable into spherical alumina particles by the oil-drop method has long been prepared by using a method of digesting metallic aluminum witnh an aqueous hydrochloric acid solution and/or an aqueous aluminum chloride solution. However, this method is defective in that the use of said metallic aluminum results in expensive spherical alumina particles because the metallic aluminum is itself expensive. Accordingly, in order to reduce the high cost of the spherical alumina particles there has been proposed a method of preparing the alumina hydrosol transformable into spherical alumina particles by the oil-drop method from gibbsite in Japanese Patent Publication No. 31118/1978, Japanese Laid Open Patent Application No. 60022/1980.

The method disclosed in Japanese Patent Publication No. 31118/1978 comprises preparing an aluminum chlorohydroxide solution by etching gibbsite powders with hydrochloric acid at a temperature ranging from 110° to 150° C., neutralizing the resulting solution with ammonia so that the solution has a pH ranging from 2.7 to 3.5, thereafter allowing ammonium chloride to crystallize at a temperature ranging from 0° to 25° C., and separating the resulting crystals together with other solid impurities from the solution. This method is surely advantageous in that alumina hydrosol can be prepared without using metallic aluminum but is troublesome in that the by-product ammonium chloride must be crystallized for purposes of removal.

On the other hand, Japanese Laid Open Patent Application No. 60022/1980 teaches a method which comprises preparing a basic aluminum chloride solution having an aluminum concentration in the range of from 7 to 12 wt.% and a weight ratio of aluminum to chloride (which will be referred to as Al/Cl ratio hereinafter) in the range of from 0.3 to 0.8 by reacting gibbsite with an aqueous hydrochloric acid solution at an elevated temperature and then reacting the resulting solution with metallic aluminum at an elevated temperature, thereby obtaining alumina hydrosol having an aluminum concentration in the range of from 9 to 15 wt.% and an Al/Cl ratio in the range of from 0.8 to 1.5. According to this method, wherein ammonia is not employed as in the aforesaid method of Japanese Patent Publication No. 31118/1978, there is no fear of ammonium chloride being by-produced. However, this method leaves room for improvement on the point of reducing the cost of the spherical alumina particles because the prior art method permits gibbsite to replace only about 50% of the overall amount of aluminum contained in the alumina hydrosol.

The present inventors have conducted out a series of studies on a method of preparing alumina hydrosol suitable for use in the oil-drop method from gibbsite while taking account of the above-mentioned two known techniques and consequently have discovered that, when a basic aluminum chloride solution having a specific range of aluminum concentration and Al/Cl ratio is prepared by digesting gibbsite with an aqueous hydrochloric acid solution at an elevated temperature and an elevated pressure, and the resulting basic aluminum chloride solution is neutralized with an ammonia water to thereby obtain alumina hydrosol having an aluminum concentration as well as an Al/Cl ratio suitable for the oil-drop method, the by-product ammonium chloride co-existing in the alumina hydrosol does not detrimentally affect the physical properties of the spherical alumina to be produced from this hydrosol by the oil-drop method. Instead, the ammonium chloride by-product functions to increase the viscosity of a mixture of alumina hydrosol and gelling agent as well as increase the gelation speed of said mixture in an oil bath, and as a result of this increased gelation speed, gelation of the hydrosol can be effected at a practical speed even when the greater part of the gelling agent is replaced by urea.

SUMMARY OF THE INVENTION

The method of manufacturing spherical alumina particles according to the present invention comprises the steps of: (a) digesting gibbsite, at an elevated temperature and at an elevated pressure, with an aqueous hydrochloric acid solution to thereby form an aqueous basic aluminum chloride solution having an aluminum concentration in the range of from 9 wt.% to 11 wt.% and a weight ratio of aluminum to chloride in the range of from 0.4 to 0.6; (b) adding, at an elevated temperature, an aqueous ammonia to said aqueous basic aluminum chloride solution to form an alumina hydrosol having an aluminum concentration in the range of from 7 wt.% to 10 wt.% and an Al/Cl ratio in the range of from 0.6 to 1.3 and containing ammonium chloride; or adding, at an elevated temperature, an aqueous ammonia to said aqueous basic aluminum chloride solution and then dissolving metallic aluminum therein to form an alumina hydrosol having an aluminum concentration in the range of from 7 wt.% to 14 wt.% and an Al/Cl ratio in the range of from 0.6 to 1.3 and containing ammonium chloride; (c) commingling said alumina hydrosol with a gelling agent which hydrolyzes at an elevated temperature and dispersing droplets of said mixture in a suspending medium under conditions effective to transform said droplets into hydrogel particles; and (d) ageing the thus formed hydrogel particles first in said suspending medium and then in an aqueous ammonia, washing them with water, and drying and calcining them.

DETAILED DESCRIPTION OF THE PREFERRED EMBODIMENTS

In the first stage of the present invention, gibbsite is digested with an aqueous hydrochloric acid solution at an elevated temperature and at an elevated pressure, whereby there is prepared a basic aluminum chloride solution having an aluminum concentration in the range of from 9 to 11 wt.% and an Al/Cl ratio in the range of from 0.4 to 0.6. As regards the material gibbsite, natural minerals can be employed. Generally speaking, however, gibbsite crystals separated from the decomposition products of an aqueous sodium aluminate solution are employed for this purpose. Preferably, the gibbsite should be digested under conditions of temperature ranging from 160° to 200° C. and at a pressure ranging from 4 to 10 Kg/cm².

Ammonia water is added to the aqueous basic aluminum chloride solution obtained in the first stage at a temperature lower than the digestion reaction temperature, preferably at a temperature ranging from 80° to 105° C., for the purpose of preparing alumina hydrosol having an aluminum concentration in the range of from 7 to 10 wt.% and an Al/Cl ratio in the range of from 0.6 to 1.3. In the second stage, metallic aluminum may be dissolved in the aqueous basic aluminum chloride solution as occasion demands subsequent to the addition of the ammonia water. In this case, an alumina hydrosol is prepared having an aluminum concentration in the range of from 7 to 14 wt.% and an Al/Cl ratio in the range of from 0.6 to 1.3. The dissolution of metallic aluminum inevitably acts to increase the aluminum concentration in the alumina hydrosol. Accordingly, in order to obtain spherical alumina particles having a relatively large diameter, it is desirable to use metallic aluminum in the second stage for the purpose of increasing the aluminum concentration in the alumina hydrosol.

In this connection, it is to be noted that when the aluminum concentration in the alumina hydrosol is low it acts to retard the gelation speed of the sol, and the larger the diameter of the droplets dispersed in the oil bath the more pronounced is this tendency. In addition, it is to be noted that the spherical hydrogel particles obtained from a hydrosol of low aluminum concentration are liable to crack during the drying process. This tendency becomes more and more remarkable as the diameter of the spherical hydrogel particles increases. Generally speaking, it is desirable that the aluminum concentration in the alumina hydrosol mixed with a gelling agent be more than 6.5 wt.% when a spherical alumina particle having a diameter of 1.6 mm is to be obtained, and more than 7.0 wt.% when a spherical alumina particle having a diameter of 3.2 mm is to be obtained.

The present inventors have discovered that a stoichiometric amount of ammonium chloride is by-produced in the second stage when the basic aluminum chloride solution obtained from the first stage is admixed with an ammonia water. However, the present invention permits the alumina hydrosol, obtained from the second stage and containing said ammonium chloride, to be used in the oil-drop method. In this connection, it is to be added that the Al/Cl ratio of the alumina hydrosol obtained in the second stage onward denotes a value calculated after deduction of the Cl content of by-product ammonium chloride.

The method of obtaining spherical alumina from alumina hydrosol by using the oil-drop method is well known, as U.S. Pat. No. 2,620,314 has taught. This known oil-drop method is also applicable to the ammonium chloride-containing alumina hydrosol according to the present invention. In other words, the alumina hydrosol is mixed with a gelling agent which is hydrolyzable at an elevated temperature and has a strong buffer action. The prior art teaches that any one of hexamethylenetetramine, urea and mixtures thereof is employable as the above-mentioned gelling agent. However, the use of urea retards the gelation speed of alumina hydrosol. Therefore, hexamethylenetetramine is exclusively put to practical use.

On the contrary, the alumina hydrosol obtained from the second stage of the present invention contains ammonium chloride which acts to accelerate the gelation speed of alumina hydrosol. Therefore, in the present invention ½ to ⅔ of the amount of hexamethylenetetramine mixed with alumina hydrosol can be replaced with less expensive urea. In both cases, where hexamethylenetetramine is employed as the gelling agent and where a mixture of hexamethylenetetramine and urea is employed as the gelling agent, the amount of the gelling agent used should preferably be sufficient to neutralize the chloride ions contained in the alumina hydrosol.

The mixture of alumina hydrosol and gelling agent is dispersed as droplets in a suspending medium (said medium is ordinarily situated within a vertical tower) held at a temperature sufficient to give rise to hydrolysis of the gelling agent and effect gelation of the hydrosol within a desired period of time. As the suspending medium for this purpose, an oil immiscible with water, such as a refined paraffin oil, is employed. The temperature of the suspending medium is held in the range of from 50° C. to 105° C., preferably in the range of from 88° C. to 95° C. While the hydrosol is passing, as droplets, through the suspending medium, a part of the gelling agent is hydrolyzed with ammonia, and during this period, said sol is gelled to thus form a hydrogel.

The thus obtained hydrogel is then aged in oil homogeneous to the suspending medium. The temperature for this ageing is substantially the same as the gel-forming temperature, that is, it is ordinarily in the range of from 50° C. to 105° C., preferably in the range of from 88° C. to 100° C., and the ageing time is at least 10 hours, preferably in the range of from 14 hours to 24 hours. In the course of this ageing process, the gelling agent remaining in the spherical hydrogel particles hydrolyzes, thereby achieving the further polymerization of alumina. Thereafter, spherical alumina hydrogel particles are subjected to ageing in aqueous ammonia having an ammonia concentration in the range of from 1 wt.% to 3 wt.% at a temperature in the range of from 50° C. to 105° C. for at least 7 hours.

Alternatively, the method disclosed in U.S. Pat. No. 4,108,971 is also applicable to the ageing of alumina hydrogel particles with ammonia. According to this method, the spherical alumina hydrogel particles which have been aged in the suspending medium are allowed to contact aqueous ammonia having an ammonia concentration in the range of from about 0.05 wt.% to about 0.5 wt.% for at least 1 hour and then are allowed to contact for at least 6 hours aqueous ammonia the ammonia concentration of which increases continuously from an initial concentration in the range of from about 0.05 wt.% to about 0.5 wt.% to an end concentration in the range of from about 0.8 wt.% to about 2.5 wt.%. According to this two-stage ammonia ageing procedure there can be obtained spherical alumina particles having superior physical properties.

Upon completion of the ageing process, the aged spherical alumina hydrogel particles are then washed thoroughly with hot water heated to 90° C. This washing step has an important significance to the present invention. In the preparation of alumina hydrosol according to the present invention, gibbsite is employed as the starting material. Therefore, the impurities, as contained in the gibbsite, remain even in the spherical alumina hydrogel particles after completion of ageing. However, such impurities, in particular sodium which acts as a catalyst poison, can be substantially completely removed in the form of sodium salt by means of the aforesaid washing step. The spherical particles after completion of the hot water washing step are dried at a temperature in the range of from 95° C. to 315° C. for a period of from 2 hours to 24 hours, and thereafter are calcined at a temperature in the range of from 425° C. to 750° C. for a period of from 2 hours to 12 hours, whereby the desired spherical alumina particles can be obtained. As disclosed in U.S. Pat. No. 4,108,971, dried spherical particles may be calcined in an atmosphere containing at least 30 mol.% of water in the form of vapor. When calcining is carried out in such an atmosphere, spherical alumina particles are imparted with superior thermal stability.

According to the present invention, metallic aluminum as a source for spherical alumina particles, which are useful as catalysts or catalyst carriers, can be replaced entirely by gibbsite, and even when urea is employed in conjunction with the gelling agent, the hydrosol can be gelled at a practically permissible speed because the alumina hydrosol obtained according to the method of the present invention can be gelled speedily. In addition thereto, the spherical alumina particles obtained by means of the method according to the present invention possess physical properties substantially equal to those of the spherical alumina particles obtained from metallic aluminum.

EXAMPLE I

| | | |
|---|---|---|
| Al₂O₃ | 65.0 | wt. % |
| Na₂O | 0.27 | wt. % |
| Fe₂O₃ | 0.007 | wt. % |
| SiO₂ | 0.008 | wt. % |

500 g of commercially available gibbsite having the above-mentioned composition and 1045 ml of 32.5% hydrochloric acid were placed in a pressure reactor equipped with a stirrer and were subjected to two hours' reaction, with stirring, at 180° C. and 6 Kg/cm². The resulting basic aluminum chloride solution was analyzed as follows:

| | | |
|---|---|---|
| Specific gravity | 1.405 | g/cc |
| Al | 10.0 | wt. % |
| Cl | 22.0 | wt. % |
| Al/Cl | 0.45 | |
| Na | 0.055 | wt. % |

1000 ml of the above basic aluminum chloride solution were placed in a reactor equipped with a stirrer and a cooler and heated to 90° C. Thereafter, 400 ml of 25% aqueous ammonia was introduced into the solution, with stirring, for 30 minutes through a conduit opening in the reactor. After the aqueous ammonia had been introduced, the solution was subjected to one hour's reaction at a temperature in the range of from 95° C. to 100° C. to thereby obtain a perfectly transparent alumina hydrosol. The thus obtained alumina hydrosol was analyzed as follows:

| | | |
|---|---|---|
| Specific gravity | 1.264 | g/cc |
| Al | 7.9 | wt. % |
| Cl* | 6.9 | wt. % |
| Al/Cl | 1.14 | |
| NH₄Cl | 15.7 | wt. % |
| Na | 0.043 | wt. % |

*does not include the content of Cl in NH₄Cl.

To 1000 ml of the above hydrosol was added 67 g (90 mol %) of urea. This mixture was dissolved with stirring at a temperature in the range of from 25° C. to 30° C., and then 179 ml (90 mol %) of a 40% hexamethylenetetramine solution were added thereto. The resulting mixture was mixed thoroughly with stirring, thereby obtaining a sol usable in an oil-drop process having the following analytical values:

| | | |
|---|---|---|
| Al | 6.5 | wt. % |
| Cl | 5.7 | wt. % |
| Al/Cl | 1.14 | |
| Viscosity | 22 | cp |

Subsequently, the aforesaid sol for use in the oil-drop method was allowed to disperse as droplets in a vertical column charged with paraffin oil maintained at about 92° C. Then, the hydrogel particles recovered from the bottom of the column were transferred to a separate vessel and were aged for 15 hours in the paraffin oil maintained at a temperature in the range of from 95° C. to 100° C. Next, 1.5 wt.% aqueous ammonia maintained at 92° C. was introduced into the column from its bottom so as to displace the paraffin oil, and the hydrogel particles were aged within this aqueous ammonia solution for 8 hours. After completion of the ageing, the hydrogel particles were washed in running water having a temperature of 90° C. for 7 hours, and then were dried thoroughly at 120° C. The thus dried particles were calcined in air at 350° C. for 1 hour, at 510° C. for 1 hour and further at 630° C. for 2 hours to thereby obtain particles of spherical alumina A.

In this instance, it was observed that in a case where 658 ml (180 mol %) of an aqueous 40% hexamethylenetetramine solution was employed as the gelling agent in lieu of the concurrent use of urea and hexamethylenetetramine, the mixture of said gelling agent and hydrosol became viscous to such a high extent as to display a paste-like state and therefore was in no way usable in an oil-drop process.

EXAMPLE II

The same procedure as in Example I was repeated with the exception that the amount of the 25% aqueous ammonia to be added to the basic aluminum chloride solution and the amounts of the urea and 40% HMT solution to be added to the ammonium chloride-containing alumina hydrosol were changed, whereby there were obtained particles of spherical alumina B and C.

TABLE I

| | Spherical alumina B | Spherical alumina C |
|---|---|---|
| Basic aluminum chloride solution | 1,000 ml | 1,000 ml |
| 25% HN₃ aqueous solution | 370 ml | 420 ml |
| Ammonium chloride-containing alumina solution | | |
| Specific gravity | 1.272 g/cc | 1.259 g/cc |
| Al, wt. % | 8.1 | 7.8 |
| Cl*, wt. % | 7.9 | 6.3 |
| Al/Cl | 1.03 | 1.24 |
| NH₄Cl, wt. % | 14.9 | 16.5 |
| Na, wt. % | 0.044 | 0.043 |
| Urea | 76 g | 61 g |
| 40% HMT solution | 203 ml | 162 ml |
| Sol for use in oil-drop | | |
| Al, wt. % | 6.5 | 6.6 |
| Cl, wt. % | 6.3 | 5.3 |
| Al/Cl | 1.03 | 1.24 |

TABLE I-continued

|  | Spherical alumina B | Spherical alumina C |
|---|---|---|
| Viscosity cp | 24 | 18 |

*does not include the Cl content in NH$_4$Cl.

EXAMPLE III

The same procedure as in Example I was repeated with the exception that the amount of aqueous ammonia to be poured into the basic aluminum chloride solution was reduced to 300 ml to thereby prepare a completely transparent first alumina hydrosol. This first hydrosol was analyzed to have the following values:

| Specific gravity | 1.290 g/cc |  |
| Al | 8.4 | wt. % |
| Cl* | 10.5 | wt. % |
| Al/Cl | 0.85 |  |
| NH$_4$Cl | 12.0 | wt. % |
| Na | 0.046 | wt. % |

*does not include the Cl content in NH$_4$Cl.

Upon placing 1000 ml of the first alumina hydrosol in a reactor charged with 300 g of metallic aluminum, 8 hours' reaction was conducted at a temperature in the range of from 90° C. to 100° C., and thereafter the unreacted metallic aluminum was separated therefrom to thereby obtain a second alumina hydrosol having the following analytical values:

| Specific gravity | 1.336 g/cc |  |
| Al | 11.5 | wt. % |
| Cl* | 10.1 | wt. % |
| Al/Cl | 1.14 |  |
| NH$_4$Cl | 8.8 | wt. % |
| Na | 0.034 | wt. % |

*does not include the Cl content in NH$_4$Cl.

Subsequently, 103 g (90 mol %) of urea was added to 1000 ml of the above-mentioned second hydrosol, the resulting mixture was dissolved with stirring at a temperature in the range of from 25° C. to 30° C., and thereafter 272 ml of water and 272 ml (90 mol %) of 40% hexamethylenetetramine solution were further added thereto and mixed thoroughly with stirring, thereby obtaining a sol usable in an oil-drop process and having the following analytical values:

| Al | 7.5 | wt. % |
| Cl | 6.6 | wt. % |
| Al/Cl | 1.14 |  |
| Viscosity | 23 | cp |

The thus obtained sol was dispersed as droplets in the paraffin oil, and successively aged, washed with water, dried and calcined in accordance with the same procedure as Example I thereby obtaining spherical alumina D.

COMPARATIVE EXAMPLE

Alumina hydrosol was prepared from metallic aluminum and hydrochloric acid without using gibbsite at all.

Upon placing 1000 ml of 15% hydrochloric acid in a reactor charged with 1000 g of metallic aluminum, 10 hours' reaction was conducted at a temperature in the range of from 100° C. to 110° C., and thereafter the unreacted metallic alumina was separated therefrom to thereby obtain an alumina hydrosol having the following analytical values:

| Specific gravity | 1.395 g/cc |  |
| Al | 13.5 | wt. % |
| Cl | 11.7 | wt. % |
| Al/Cl | 1.15 |  |
| Na | 0.000 | wt. % |

Subsequently, 388 ml of water and 658 ml (180 mol %) of the 40% hexamethylenetetramine solution were added to 1000 ml of the alumina hydrosol, and the resulting mixture was mixed thoroughly with stirring at a temperature in the range of from 25° C. to 30° C. to thereby prepare a sol available for an oil-drop process and having the following analytical values:

| Al | 7.5 | wt. % |
| Cl | 6.5 | wt. % |
| Al/Cl | 1.15 |  |
| Viscosity | 25 | cp |

Next, the thus obtained sol was dropped in the paraffin oil, and successively aged, washed with water, dried and calcined in accordance with the same procedure as Example I to thereby obtain spherical alumina X.

In this instance, it was observed that when the mixture of 90 mol % of urea and 90 mol % of hexamethylenetetramine was employed as the gelling agent as in Example I in place of 180 mol % of hexamethylenetetramine, the viscosity of the mixture of the gelling agent and hydrosol was lower than 10 cp and therefore difficult to drop, and further that the obtained spherical hydrogel was also soft to such an extent as to allow the spherical bodies to aggregate mutually.

The properties of spherical aluminas obtained in accordance with Examples I to II and the Comparative Example are as shown in the following table.

TABLE II

| SPHERICAL ALUMINA | PROPERTIES OF SPHERICAL ALUMINAS | | | | | | | | |
|---|---|---|---|---|---|---|---|---|---|
|  | A | | B | | C | | D | | X |
| Diameter of spherical body (mm) | 1.6 | 3.2 | 1.6 | — | 1.6 | — | 1.6 | 3.2 | 1.6 | 3.2 |
| Utilization rate of gibbsite (%) | 100 | 100 | 100 | — | 100 | — | 70 | 70 | 0 | 0 |
| Apparent bulk density (g/cc) | 0.49 | 0.48 | 0.35 | — | 0.61 | — | 0.50 | 0.52 | 0.52 | 0.51 |
| Average crushing strength (Kg/particle) | 5.4 | 28.7 | 3.6 | — | 9.5 | — | 5.5 | 35.4 | 5.2 | 36.2 |
| Surface area of BET (m$^2$/g) | 205 | 205 | 206 | — | 230 | — | 203 | 207 | 206 | 210 |
| Cl (wt. %) | 0.36 | 0.41 | 0.31 | — | 0.41 | — | 0.30 | 0.34 | 0.26 | 0.35 |

TABLE II-continued

| SPHERICAL ALUMINA | PROPERTIES OF SPHERICAL ALUMINAS | | | | | | | | |
|---|---|---|---|---|---|---|---|---|---|
| | A | | B | C | | D | | | X |
| Na (wt. %) | 0.0008 | 0.0008 | 0.0007 | — | 0.0006 | — | 0.0006 | 0.0006 | 0.0002 | 0.0001 |

As is evident from the results shown in the above table, spherical aluminas A, B, C and D manufactured by means of the method according to the present invention exhibit substantially the same properties as the spherical alumina X prepared without using gibbsite at all. It can also be understood therefrom that 99% or more of the sodium admixed with gibbsite can be removed by washing with water.

Taking the case in which the diameter of spherical body is 3.2 mm in the above table, it is noted therefrom that the spherical alumina D, wherein the aluminum concentration in the sol for use in oil-dropping processes is 7.5 wt.%, has an average crushing strength of 35.4 Kg, which is substantially equal to 36.2 Kg of the spherical alumina X prepared without using gibbsite at all. In contradiction to this, the spherical alumina A, wherein the aluminum concentration is 6.5 wt.%, has an average crushing strength of 28.7 Kg, which is about 20% lower than that of the spherical alumina X. This may be explained as follows. When the aluminum concentration in the sol for use in oil-dropping processes is low it acts to retard the gelation speed, and the larger the diameter of the droplets dispersed in the oil bath the more this tendency becomes remarkable. Due to this, the spherical body comes to have an uneven surface caused by contact of one spherical body with another during ageing and washing processes, and additionally the spherical alumina obtained from a hydrosol of low aluminum concentration is liable to crack during the drying process, this tendency being more and more remarkable as the diameter of the spherical alumina increases. Accordingly, when the alumina particle has an enlarged diameter, its average crushing strength is increasingly enhanced as the aluminum concentration in the sol for use in oil-dropping processes increases, thereby producing desirable results.

What is claimed is:

1. A method of manufacturing spherical alumina particles comprising the steps of:
    (a) digesting, at an elevated temperature and an elevated pressure, gibbsite with an aqueous hydrochloric acid solution to thereby form an aqueous basic aluminum chloride solution having an aluminum concentration in the range of from 9 wt.% to 11 wt.% and a weight ratio of aluminum to chloride in the range of from 0.4 to 0.6;
    (b) adding, at an elevated temperature, an aqueous ammonia solution to said aqueous basic aluminum chloride solution under conditions effective to form an alumina hydrosol containing ammonium chloride, said alumina hydrosol having an aluminum concentration in the range of from 7 wt.% to 10 wt.% and a weight ratio of aluminum to chloride in the range of from 0.6 to 1.3, wherein said weight ratio of aluminum to chloride is calculated on the basis of excluding the chlorine content of said ammonium chloride;
    (c) then commingling said alumina hydrosol with a gelling agent which hydrolyzes at an elevated temperature thereby forming a mixture, and then dispersing droplets of said mixture in a suspending medium under conditions effective to transform said droplets into hydrogel particles; and
    (d) ageing said hydrogel particles first in said suspending medium and then in aqueous ammonia, and thereafter washing said hydrogel particles with water, then drying and calcining said hydrogel particles to obtain said spherical alumina particles.

2. A method according to claim 1 in which digestion of gibbsite in the step (a) is carried out at a temperature in the range of from 160° C. to 200° C. and at a pressure in the range of from 4 Kg/cm² to 10 Kg/cm².

3. A method according to claim 1 in which step (b) is carried out at a temperature in the range of from 80° C. to 105° C.

4. A method according to claim 1 in which said gelling agent used in step (c) comprises hexamethylenetetramine and urea.

5. A method of manufacturing spherical alumina comprising the steps of:
    (a) digesting, at an elevated temperature and an elevated pressure, gibbsite with an aqueous hydrochloric acid solution to thereby form an aqueous basic aluminum chloride solution having an aluminum concentration in the range of from 9 wt.% to 11 wt.% and a weight ratio of aluminum to chloride in the range of from 0.4 to 0.6;
    (b) adding, at an elevated temperature, an aqueous ammonia solution to said aqueous basic aluminum chloride solution, and then dissolving metallic aluminum in the resulting mixture under conditions effective to form an alumina hydrosol containing ammonium chloride, said alumina hydrosol having an aluminum concentration in the range of from 7 wt.% to 14 wt.% and a weight ratio of aluminum to chloride in the range of from 0.6 to 1.3, wherein said weight ratio of aluminum to chloride is calculated on the basis of excluding the chlorine content of said ammonium chloride;
    (c) then commingling said alumina hydrosol with a gelling agent which hydrolyzes at an elevated temperature, thereby forming a mixture, and then dispersing said mixture as droplets in a suspending medium under conditions effective to transform said droplets into hydrogel particles; and
    (d) ageing said hydrogel particles first in said suspending medium and then in aqueous ammonia, and thereafter washing said hydrogel particles with water, then drying and calcining said hydrogel particles to obtain said spherical alumina particles.

6. A method according to claim 5 in which digestion of gibbsite in step (a) is carried out at a temperature in the range of from 160° C. to 200° C. and at a pressure in the range of from 4 Kg/cm² to 10 Kg/cm².

7. A method according to claim 5 in which step (b) is carried out at a temperature in the range of from 80° C. to 105° C.

8. A method according to claim 5 in which said gelling agent used in step (c) comprises hexamethylenetetramine and urea.

9. A method according to claim 1 or claim 5 in which said suspending medium is an inert, organic oil immiscible with water having a temperature of from 50° to 105° C.

10. A method according to claim 9, in which said suspending medium is paraffin oil.

* * * * *